(12) United States Patent
Yamamoto et al.

(10) Patent No.: US 12,244,254 B2
(45) Date of Patent: Mar. 4, 2025

(54) POWER CONVERSION DEVICE

(71) Applicant: DAIKIN INDUSTRIES, LTD., Osaka (JP)

(72) Inventors: Masahiro Yamamoto, Osaka (JP); Masaki Nakaishi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 144 days.

(21) Appl. No.: 18/143,890

(22) Filed: May 5, 2023

(65) Prior Publication Data

US 2023/0275533 A1 Aug. 31, 2023

Related U.S. Application Data

(63) Continuation of application No. PCT/JP2021/041610, filed on Nov. 11, 2021.

(30) Foreign Application Priority Data

Nov. 11, 2020 (JP) .................. 2020-188082

(51) Int. Cl.
*H02P 27/06* (2006.01)
*H02K 7/09* (2006.01)
(Continued)

(52) U.S. Cl.
CPC .............. *H02P 27/06* (2013.01); *H02K 7/09* (2013.01); *H02K 11/33* (2016.01); *H02M 7/05* (2021.05);
(Continued)

(58) Field of Classification Search
CPC ........ H02P 27/06; H02P 6/182; H02P 29/028; H02P 5/60; H02P 29/025; H02P 27/08;
(Continued)

(56) References Cited

U.S. PATENT DOCUMENTS

2008/0104983 A1* 5/2008 Yamai ................. H02M 1/14
363/36

FOREIGN PATENT DOCUMENTS

| EP | 3 681 032 A1 | 7/2020 |
| JP | 2001-37239 A | 2/2001 |
| JP | 2010-200524 A | 9/2010 |

OTHER PUBLICATIONS

European Search Report of corresponding EP Application No. 21 89 1970.2 dated Sep. 4, 2024.
(Continued)

*Primary Examiner* — Said Bouziane
(74) *Attorney, Agent, or Firm* — GLOBAL IP COUNSELORS, LLP

(57) ABSTRACT

A power conversion device includes a converter circuit, an inverter circuit including a switching element, a first capacitor, a buffer circuit, and a current supply circuit. The converter circuit converts a first alternating current into a direct current, and outputs the direct current to a pair of wires. The inverter circuit converts the direct current into a second alternating current by a switching operation of the switching element, and supplies the second alternating current to drive coils of a motor so that a drive shaft is rotationally driven. The first capacitor and the buffer circuit are connected between the pair of wires. The buffer circuit includes a second capacitor and a regulator connected in series. The current supply circuit supplies a current to support coils using energy stored in the second capacitor so that a load of the drive shaft is supported in a non contact manner.

20 Claims, 11 Drawing Sheets

(51) Int. Cl.
   *H02K 11/33*   (2016.01)
   *H02M 7/04*    (2006.01)
   *H02M 7/06*    (2006.01)
   *H02M 7/537*   (2006.01)
   *H02P 6/182*   (2016.01)

(52) U.S. Cl.
   CPC ............ *H02M 7/06* (2013.01); *H02M 7/537* (2013.01); *H02P 6/182* (2013.01)

(58) Field of Classification Search
   CPC ............ H02J 7/345; H02M 1/32; H02M 1/14; H02M 1/007; H02M 7/219; H02M 7/537; H02M 7/06; H02M 7/003; H02M 7/05; H02M 7/5387; H02K 7/14; H02K 11/33; H02K 7/09
   See application file for complete search history.

(56) References Cited

OTHER PUBLICATIONS

International Preliminary Report of corresponding PCT Application No. PCT/JP2021/041610 dated May 25, 2023.
International Search Report of corresponding PCT Application No. PCT/JP2021/041610 dated Jan. 25, 2022.

* cited by examiner

FIG.3
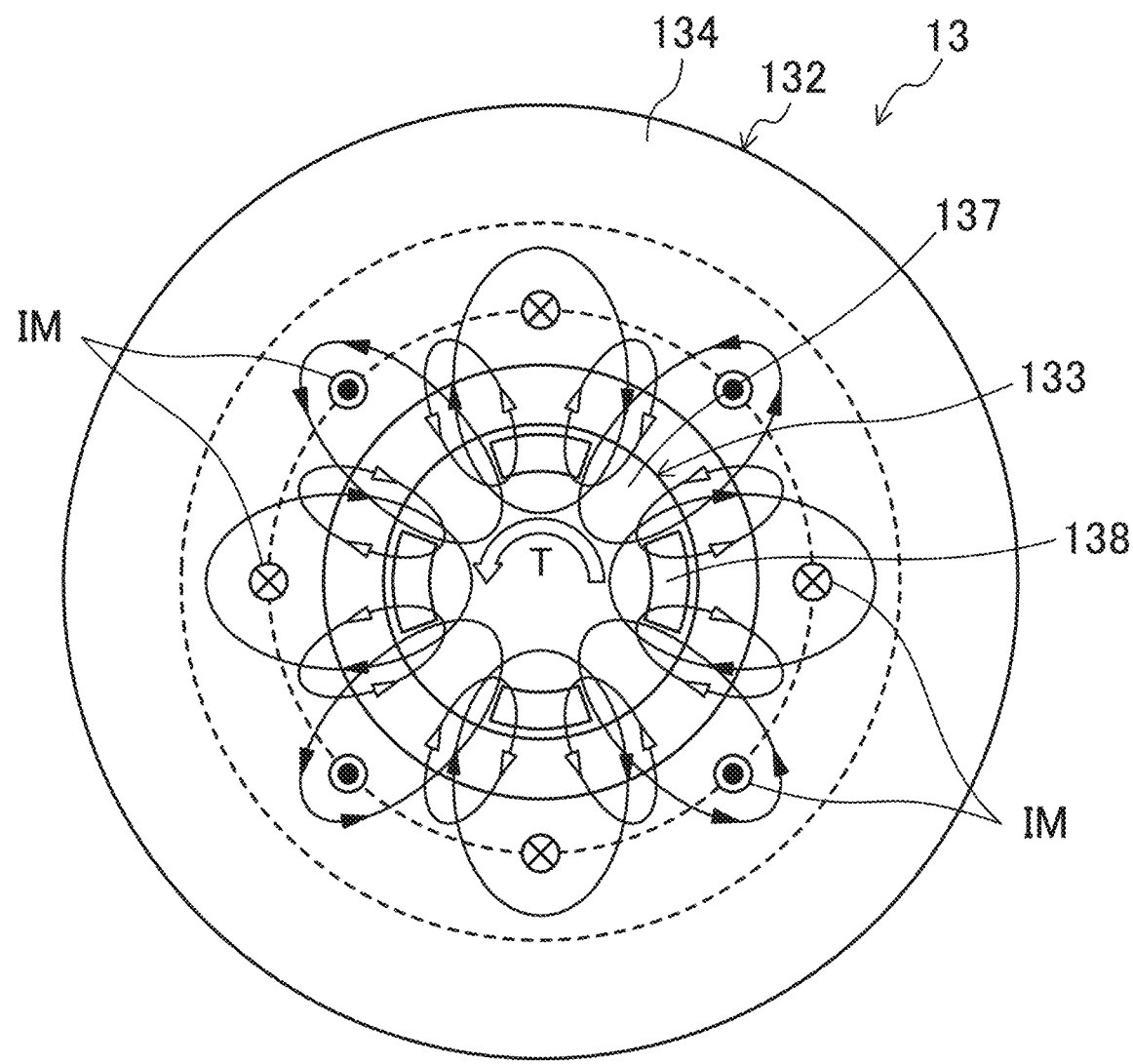
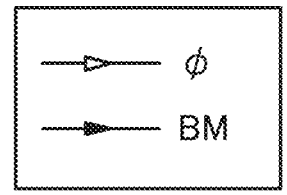

POWER CONVERSION DEVICE

CROSS-REFERENCE TO RELATED APPLICATIONS

This is a continuation of International Application No. PCT/JP2021/041610 filed on Nov. 11, 2021, which claims priority to Japanese Patent Application No. 2020-188082, filed on Nov. 11, 2020. The entire disclosures of these applications are incorporated by reference herein.

BACKGROUND

Technical Field

The present disclosure relates to a power conversion device that rotationally drives a drive shaft of a motor and supplies power to support coils that support the drive shaft in a non-contact manner by an electromagnetic force.

Background Art

Japanese Unexamined Patent Publication No. 2010-200524 discloses a power conversion device that rotationally drives a drive shaft of a motor and supplies power to support coils that support the drive shaft in a non-contact manner by an electromagnetic force. The power conversion device includes a converter circuit that converts a first alternating current from an AC power source into a direct current, an inverter circuit that converts an output of the converter circuit into a second alternating current and supplies the second alternating current to drive coils of the motor so that the drive shaft is rotationally driven, a current supply circuit that converts the output of the converter circuit into a third alternating current and supplies the third alternating current to the support coils, and a capacitor connected between DC nodes of the inverter circuit. In case of power failure, the inverter circuit is regeneratively controlled to regenerate power generated by the motor to the capacitor.

SUMMARY

A first aspect of the present disclosure is directed to a power conversion device. configured to rotationally drive a drive shaft of a motor and supply power to support coils that support the drive shaft in a non contact manner by an electromagnetic force. The power conversion device includes a converter circuit, an inverter circuit including a switching element, a first capacitor, a buffer circuit, and a current supply circuit. The converter circuit is configured to convert a first alternating current from an AC power source into a direct current, and output the direct current to a pair of wires. The inverter circuit is configured to convert the direct current outputted from the converter circuit to the pair of wires into a second alternating current by a switching operation of the switching element, and supply the second alternating current to drive coils of the motor so that the drive shaft is rotationally driven. The first capacitor is connected between the pair of wires. The buffer circuit includes a second capacitor and a regulator connected in series with the second capacitor. The buffer circuit is connected between the pair of wires. The current supply circuit is configured to supply a current to the support coils using energy stored in the second capacitor so that a load of the drive shaft is supported in a non contact manner. The first capacitor is configured to allow pulsation of a voltage outputted from the converter circuit, and absorb voltage variation between the pair of wires caused by the switching operation. The regulator is configured to regulate a current flowing from the second capacitor to the first capacitor so that the current flowing from the second capacitor to the first capacitor when the second capacitor has a higher voltage than the first capacitor by a predetermined voltage difference is smaller than a current flowing from the first capacitor to the second capacitor when the first capacitor has a higher voltage than the second capacitor by the predetermined voltage difference.

BRIEF DESCRIPTION OF THE DRAWINGS

FIG. 3 is a schematic cross-sectional view of the motor illustrating magnet magnetic flux and driving magnetic flux.

DETAILED DESCRIPTION OF EMBODIMENT(S)

Embodiments of the present disclosure will be described below with reference to the drawings. The following embodiments are merely exemplary ones in nature, and are not intended to limit the scope, applications, or use of the invention.

First Embodiment

Figure 1:
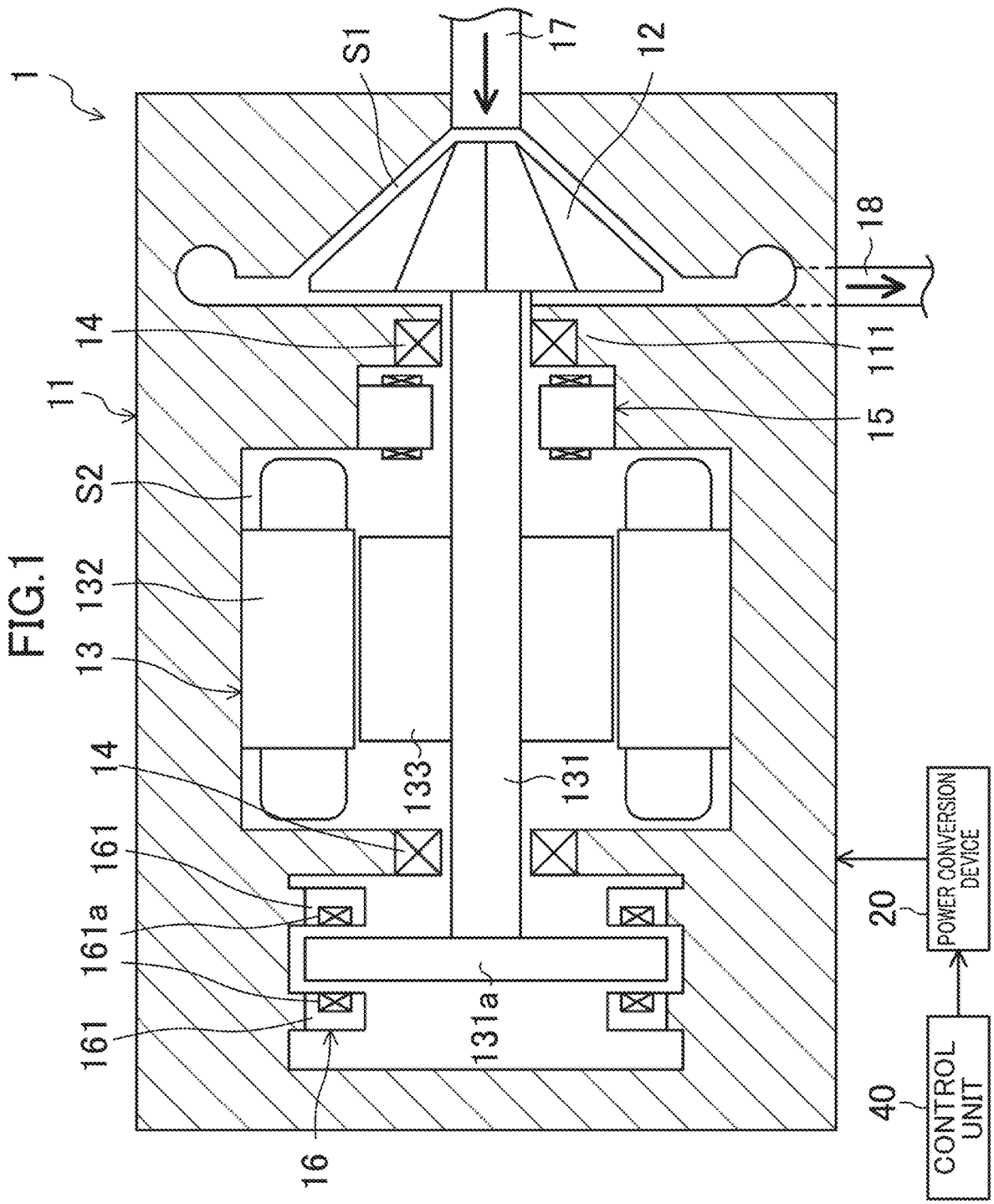
FIG. 1 is a schematic diagram illustrating a configuration of a turbo compressor including a power conversion device of a first embodiment of the present disclosure.

FIG. 1 shows a turbo compressor (1). The turbo compressor (1) is provided in a refrigerant circuit (not shown) that performs a refrigeration cycle to compress a refrigerant. The turbo compressor (1) includes a casing (11), an impeller (12), a motor (13), a pair of touchdown bearings (14), one radial magnetic bearing (15), a thrust magnetic bearing (16), a power conversion device (20), and a control unit (40).

The casing (11) is formed in a substantially cylindrical shape and is arranged with its cylindrical axis oriented horizontally. Space in the casing (11) is axially divided by a wall portion (111) into an impeller chamber (S1) that houses the impeller (12) and a motor chamber (S2) that houses the motor (13). A suction pipe (17) and a discharge pipe (18) are connected to the impeller chamber (S1).

The impeller (12) has a plurality of blades and has a substantially conical outer shape. The impeller (12) is housed in the impeller chamber (S1).

The motor (13) is a bearingless motor. The motor (13) includes a drive shaft (131), a stator (132), and a rotor (133). One end of the drive shaft (131) is fixed to a center of a larger face of the impeller (12). A disc portion (131a) is formed to project from the other end of the drive shaft (131). The rotor (133) is fixed to the drive shaft (131), and the stator (132) is fixed to the casing (11). The rotor (133) and the stator (132) are housed in the motor chamber (S2).

Figure 2:
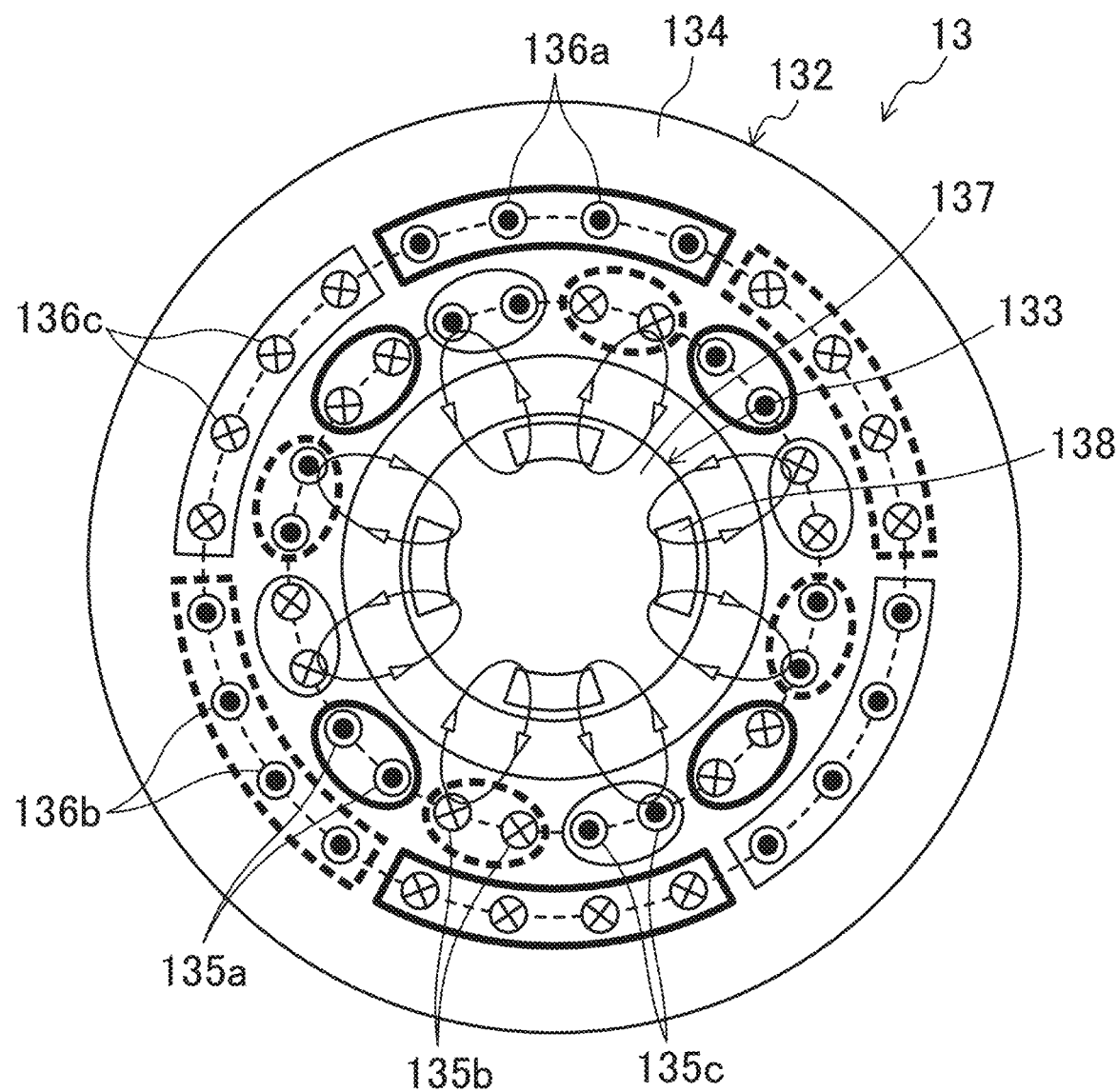
FIG. 2 is a schematic cross-sectional view of a motor.

The stator (132) of the motor (13) is made of a magnetic material (e.g., a laminated steel plate). FIG. 2 is a schematic cross-sectional view of the motor (13). The stator (132) has a back yoke (134), a plurality of teeth (not shown), and drive coils (135a to 135c) and in-motor support coils (136a to 136c) that are wound about the teeth.

The back yoke (134) of the stator (132) is formed in a cylindrical shape. Each of the drive coils (135a to 135c) and the in-motor support coils (136a to 136c) is wound about a corresponding one of the teeth by distributed winding or concentrated winding. The in-motor support coils (136a to 136c) are configured to support a radial load of the drive shaft (131) in a non-contact manner by an electromagnetic force generated when a current flows through the in-motor support coils (136a to 136c).

Each drive coil (135a to 135c) is wound about a radially inner part of a corresponding one of the teeth. The drive coils (135a to 135c) include a U-phase drive coil (135a) circled with a thick solid line, a V-phase drive coil (135b) circled with a thick broken line, and a W-phase drive coil (135c) circled with a thin solid line in FIG. 2.

Each in-motor support coil (136a to 136c) is wound about a radially outer part of a corresponding one of the teeth. The in-motor support coils (136a to 136c) include a U-phase in-motor support coil (136a) surrounded by a thick solid-line rectangle, a V-phase in-motor support coil (136b) surrounded by a thick broken-line rectangle, and a W-phase in-motor support coil (136c) surrounded by a thin solid-line rectangle in FIG. 2.

The rotor (133) of the motor (13) includes a core (137) and a plurality of permanent magnets (138) (four permanent magnets in this example) embedded in the core (137).

The core (137) of the rotor (133) is formed in a cylindrical shape. A shaft hole (not shown) for receiving the drive shaft (131) is formed in the center of the core (137). The core (137) is made of a magnetic material (e.g., a laminated steel plate).

The permanent magnets (138) are embedded at regular intervals in the circumferential direction of the rotor (133). The permanent magnets (138) have the same shape. Each permanent magnet (138) has an N pole on an outer peripheral surface, and the core (137) between the permanent magnets (138) has an S pole on an outer peripheral surface.

FIG. 3 shows the motor (13) with magnet magnetic flux φ that is generated by each permanent magnet (138) and driving magnetic flux BM that is generated to rotationally drive the drive shaft (131). The motor (13) is configured to generate driving torque T shown in FIG. 3 by interaction between the magnet magnetic flux φ and the driving magnetic flux BM. In FIG. 3, a current IM equivalent to the current flowing through the drive coils (135a to 135c) is shown.

Figure 4:
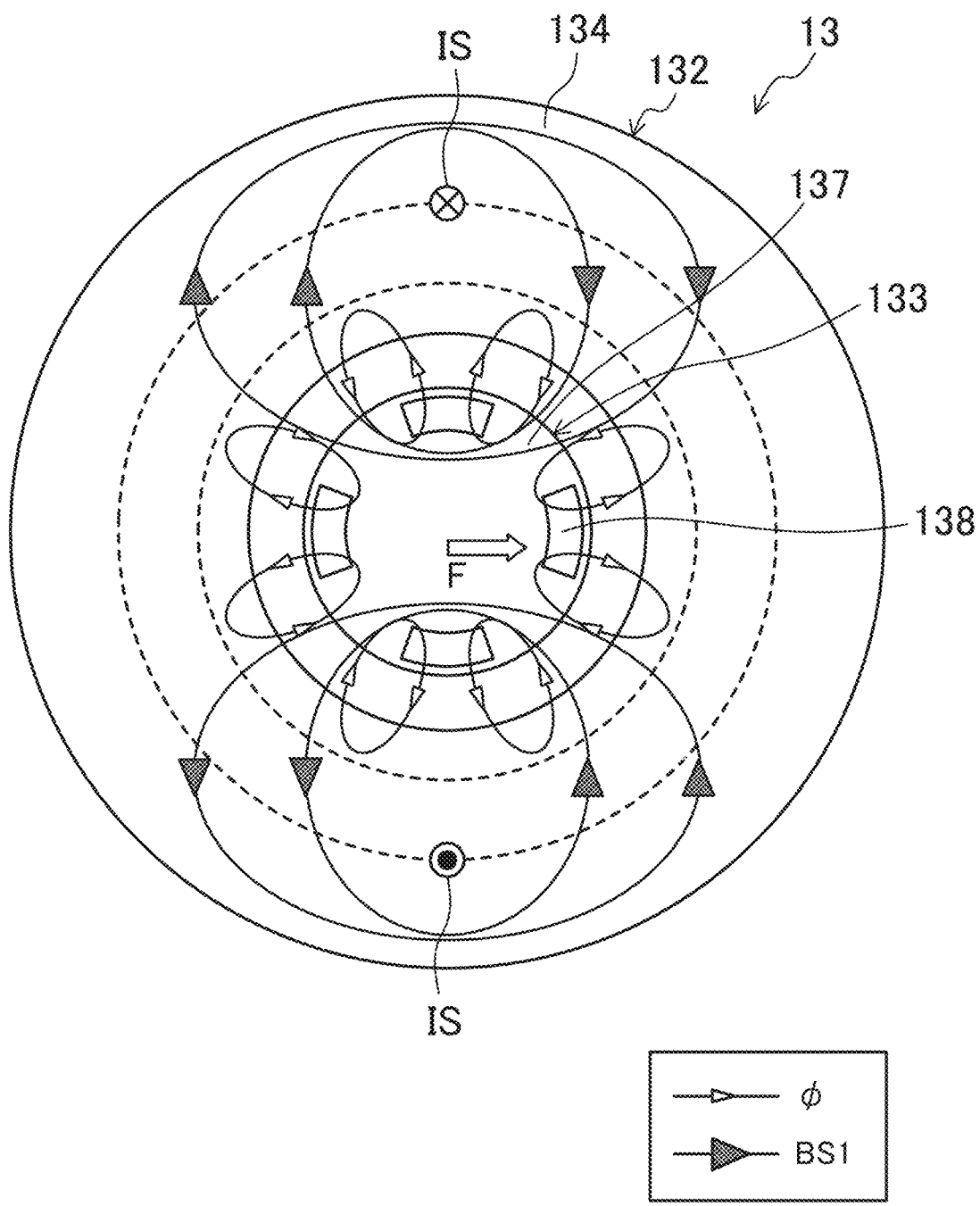
FIG. 4 is a schematic cross-sectional view of the motor illustrating magnet magnetic flux and supporting magnetic flux.

FIG. 4 shows the motor (13) with magnet magnetic flux φ that is generated by each permanent magnet (138) and supporting magnetic flux B S1 that is generated to support the radial load of the drive shaft (131) in a non-contact manner. The motor (13) is configured to generate a support force F shown in FIG. 4 by interaction between the magnet magnetic flux φ and the supporting magnetic flux BS1. In FIG. 4, a current IS equivalent to the current flowing through the in-motor support coils (136a to 136c) is shown.

One of the pair of touchdown bearings (14) is provided on the drive shaft (131) to be located near the impeller (12), and the other touchdown bearing (14) is provided on the drive shaft (131) to be located near the disc portion (131a). The touchdown bearings (14) are configured to support the drive shaft (131) when the motor (13) is non-energized (i.e., when the drive shaft (131) is not levitated).

The radial magnetic bearing (15) is fixed to an inner peripheral wall of the casing (11) between of the rotor (133) and stator (132) of the motor (13) and the impeller (12).

Figure 5:
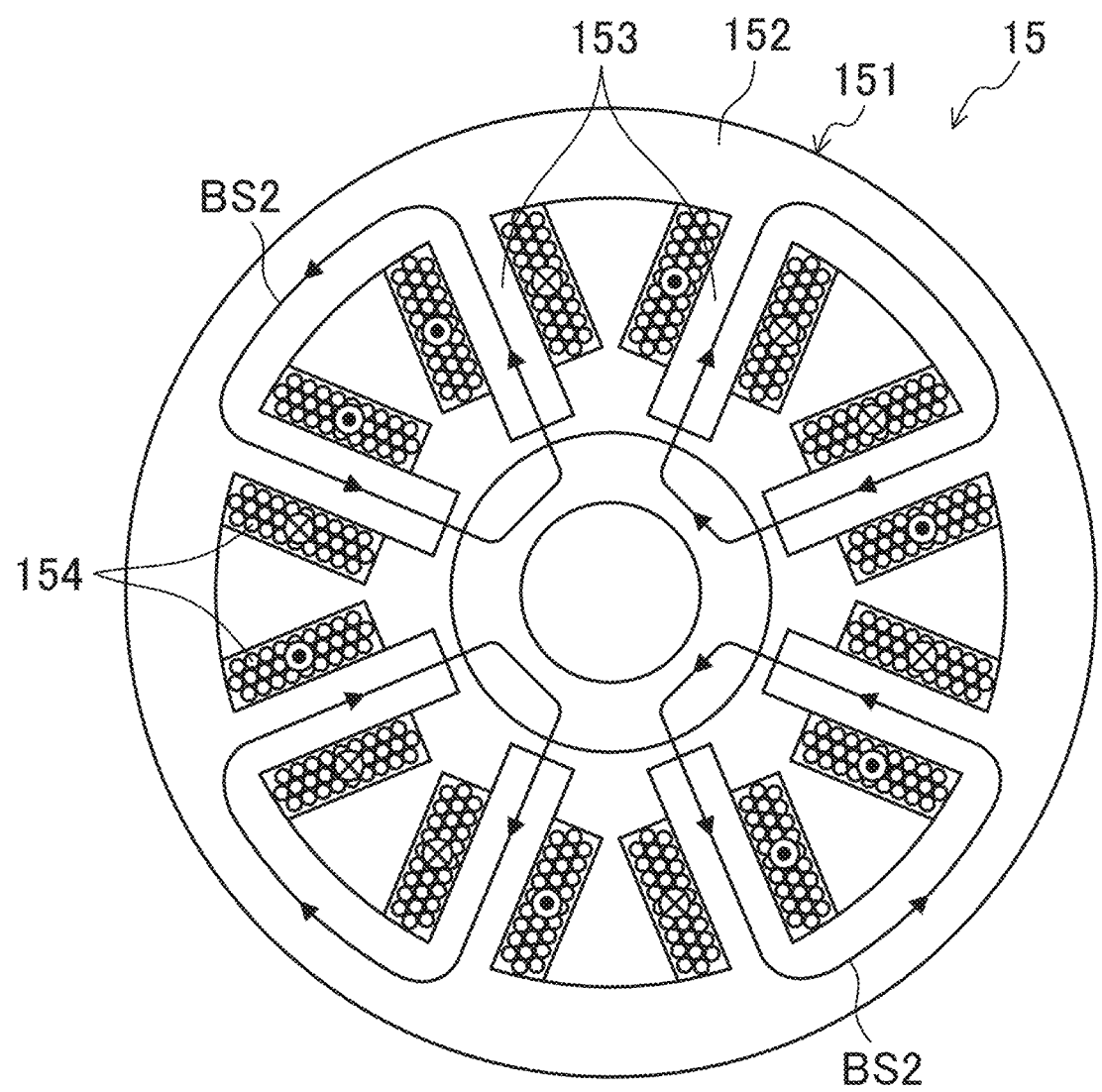
FIG. 5 is a schematic cross-sectional view of a radial magnetic bearing.

FIG. 5 is a transverse cross-sectional view illustrating a configuration example of the radial magnetic bearing (15). As illustrated in FIG. 5, the radial magnetic bearing (15) is configured as a heteropolar magnetic bearing. The radial magnetic bearing (15) includes a stator (151) having a back yoke (152) and a plurality of teeth (153), and four radial magnetic bearing coils (154), each of which is a support coil wound about a corresponding one of the teeth (153). Each radial magnetic bearing coil (154) supports a radial load of the drive shaft (131) in a non-contact manner by an electromagnetic force generated when the current is supplied to the radial magnetic bearing coil (154). The directions of the currents flowing through the radial magnetic bearing coils (154) are set so that supporting magnetic flux BS2 is generated in the directions shown in FIG. 5.

The thrust magnetic bearing (16) includes a pair of thrust magnetic bearing electromagnets (161). The thrust magnetic bearing electromagnets (161) are arranged to sandwich the disc portion (131a) in the axial direction. Each of the thrust magnetic bearing electromagnets (161) has a thrust magnetic bearing coil (161a) as the support coil. Each thrust magnetic bearing coil (161a) supports the disc portion (131a) of the drive shaft (131) in a non-contact manner by an electromagnetic force generated when the current flows through the thrust magnetic bearing coil (161a). The axial position of the disc portion (131a) of the drive shaft (131) can be controlled by controlling the current flowing through the thrust magnetic bearing coils (161a).

Figure 6:
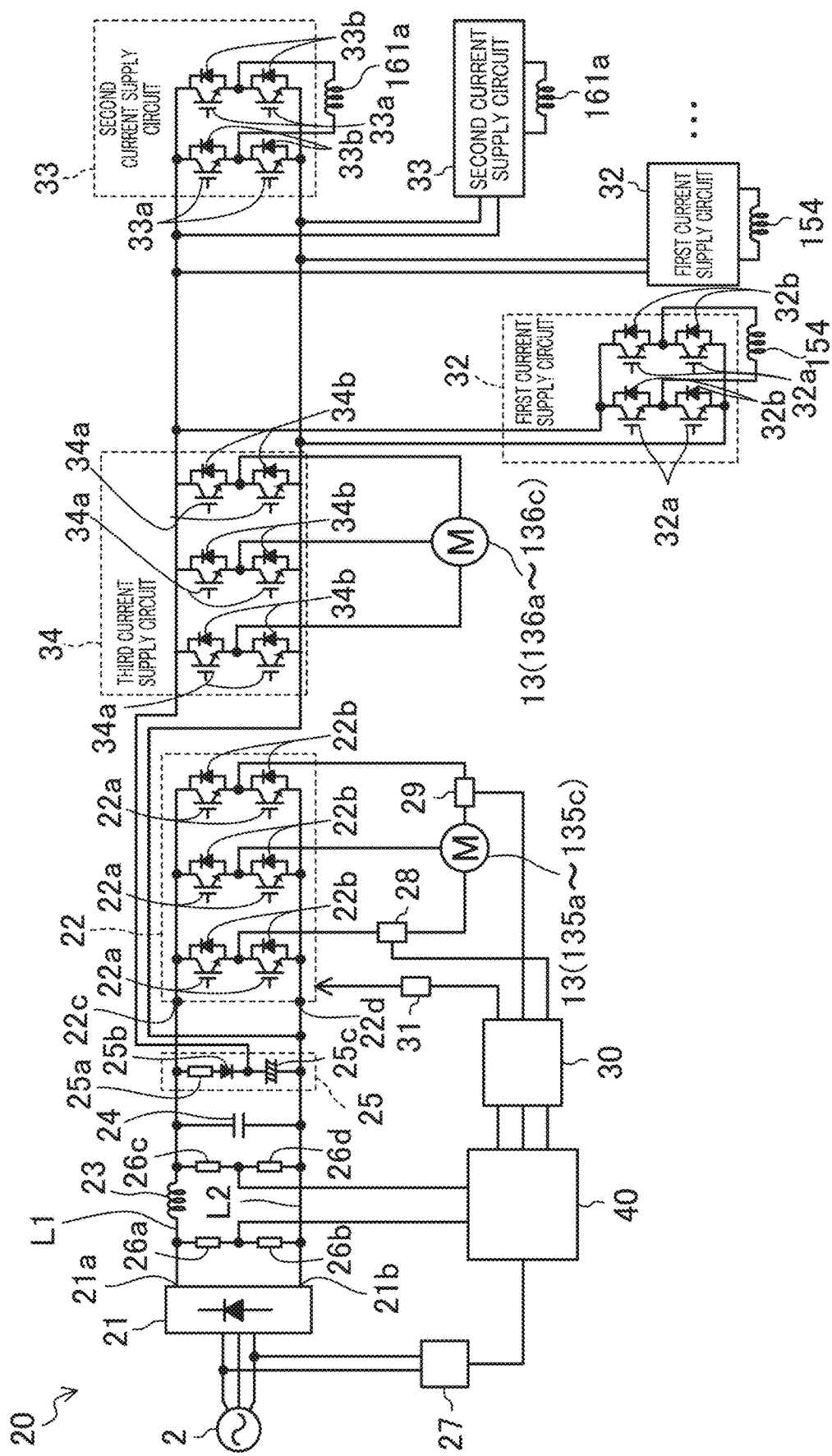
FIG. 6 is a circuit diagram illustrating a configuration of a power conversion device.

The power conversion device (20) rotationally drives the motor (13) and supplies power to the support coils (136a to 136c, 154, 161a) that support the drive shaft (131) in a non-contact manner by the electromagnetic force. As illustrated in FIG. 6, the power conversion device (20) includes a converter circuit (21), an inverter circuit (22), a reactor (23), a first capacitor (24), a surge voltage reduction circuit (25) as a buffer circuit, first to fourth voltage dividing resistors (26a to 26d), a zero-crossing detection circuit (27), a u-phase current detector (28), a w-phase current detector (29), an overcurrent protector (30), a drive circuit (31), four first current supply circuits (32), two second current supply circuits (33), and one third current supply circuit (34).

The converter circuit (21) converts a first three-phase alternating current from a three-phase AC power source (2) into a direct current and outputs the direct current from first and second output nodes (21a, 21b) to a pair of wires (L1, L2). Specifically, the converter circuit (21) is a full-wave rectifier circuit. The converter circuit (21) has bridge-connected six diodes. The direct current outputted from the converter circuit (21) is electric power whose polarity does not change although its magnitude changes with time.

The inverter circuit (22) converts the output of the converter circuit (21) into a second alternating current and supplies the second alternating current to the drive coils (135a to 135c) of the motor (13) so that the drive shaft (131) is rotationally driven. Specifically, the inverter circuit (22) includes six switching elements (22a) and six freewheeling diodes (22b). The six switching elements (22a) are bridge-connected. More specifically, the inverter circuit (22) includes three switching legs connected between the first and second DC nodes (22c, 22d). Each switching leg has two switching elements (22a) connected in series with each other.

In each of the three switching legs, a midpoint between an upper-arm switching element (22a) and a lower-arm switching element (22a) is connected to a corresponding one of the drive coils (135a to 135c) of the respective phases of the motor (13). Each of the freewheeling diodes (22b) is connected in antiparallel with a corresponding one of the switching elements (22a). The six switching elements (22a) convert the direct current outputted from the converter circuit (21) to the pair of wires (L1, L2) into the second alternating current by a switching operation.

The reactor (23) has one end connected to the first output node (21a) of the converter circuit (21) and the other end connected to the first DC node (22c) of the inverter circuit (22).

The pair of wires (L1, L2) includes a first wire (L1) connecting the first output node (21a) and the first DC node (22c) and a second wire (L2) connecting the second output node (21b) and the second DC node (22d). The reactor (23) is provided in the wire (L1).

The first capacitor (24) is connected between the first and second DC nodes (22c, 22d) of the inverter circuit (22). Specifically, the first capacitor (24) is connected between the pair of wires (L1, L2).

The capacity value of the first capacitor (24) is set so that the voltage outputted from the converter circuit (21) is hardly smoothed but a ripple voltage caused by the switching operation of the inverter circuit (22) is successfully reduced. Specifically, the first capacitor (24) allows pulsation of the voltage outputted from the converter circuit (21) and absorbs voltage variation between the pair of wires (L1, L2) caused by the switching operation of the switching element (22a). The ripple voltage is voltage variation corresponding to switching frequencies of the switching elements (22a). Thus, a DC link voltage, which is the voltage of the first capacitor (24), includes a ripple component corresponding to the frequency of the AC voltage of the three-phase AC power source (2). The three-phase AC power source (2) is a three-phase power source. Thus, the ripple component corresponding to the frequency of the three-phase AC power source (2) is six times higher than the frequency of the three-phase AC power source (2).

Specifically, the capacity of the first capacitor (24) is set so that the voltage variation of the first capacitor (24) in a switching period is 1/10 or less of the average voltage of the first capacitor (24).

The surge voltage reduction circuit (25) is connected between the first and second DC nodes (22c, 22d) of the inverter circuit (22). That is, the surge voltage reduction circuit (25) is connected in parallel with the first capacitor (24) between the pair of wires (L1, L2). The surge voltage reduction circuit (25) is connected between the reactor (23) and the inverter circuit (22). The surge voltage reduction circuit (25) includes a resistor (25a), a regulative diode (25b) serving as a regulator, and a second capacitor (25c). The resistor (25a), the regulative diode (25b), and the second capacitor (25c) are connected in series with each other in order from the first DC node (22c). That is, the resistor (25a) and the regulative diode (25b) are connected in series with the second capacitor (25c). The regulative diode (25b) has an anode connected to the resistor (25a) and a cathode connected to the second capacitor (25c). Thus, the regulative diode (25b) regulates the current flowing from the second capacitor (25c) to the first capacitor (24) so that the current flowing from the second capacitor (25c) to the first capacitor (24) when the second capacitor (25c) has a higher voltage than the first capacitor (24) by a predetermined voltage difference is smaller than a current flowing from the first capacitor (24) to the second capacitor (25c) when the first capacitor (24) has a higher voltage than the second capacitor (25c) by the predetermined voltage difference. The predetermined voltage difference is a voltage equal to or higher than a forward voltage of the regulative diode (25b). The second capacitor (25c) has a greater capacitance than the first capacitor (24).

The first and second voltage dividing resistors (26a, 26b) are connected in series between the first and second output nodes (21a, 21b) of the converter circuit (21) in order from the first output node (21a).

The third and fourth voltage dividing resistors (26c, 26d) are connected in series between the first and second DC nodes (22c, 22d) of the inverter circuit (22) in order from the first DC node (22c).

The zero-crossing detection circuit (27) outputs a zero-crossing signal indicating a zero-crossing point of a voltage between two phase voltages among the three phase voltages of the first alternating current from the three-phase AC power source (2).

The u-phase current detector (28) detects a u-phase current outputted by the inverter circuit (22).

The w-phase current detector (29) detects a w-phase current outputted by the inverter circuit (22).

The overcurrent protector (30) outputs the u-phase current detected by the u-phase current detector (28) and the w-phase current detected by the w-phase current detector (29) and outputs a PWM control signal outputted by the control unit (40) as will be described later. The overcurrent protector (30) does not output the PWM control signal when it is determined that an overcurrent has occurred based on the u-phase current detected by the u-phase current detector (28) and the w-phase current detected by the w-phase current detector (29). This allows the inverter circuit (22) to stop when the overcurrent occurs.

The drive circuit (31) converts the PWM control signal outputted from the overcurrent protector (30) to an appropriate voltage level and outputs the converted signal.

The first current supply circuits (32) use the energy stored in the second capacitor (25c) to supply a current to the radial magnetic bearing coils (154) so that the radial magnetic bearing coils (154) support the load of the drive shaft (131) in a non-contact manner. Each of the first current supply circuits (32) includes four switching elements (32a) constituting two switching legs and four freewheeling diodes (32b). Each switching leg includes two switching elements (32a) connected in series with each other and is connected in parallel with the second capacitor (25c). A midpoint between an upper-arm switching element (32a) and a lower-arm switching element (32a) of one of the switching legs is connected to one end of one of the radial magnetic bearing coils (154) of the radial magnetic bearing (15), and a midpoint between an upper-arm switching element (32a)

and a lower-arm switching element (32a) of the other switching leg is connected to the other end of the radial magnetic bearing coil (154). The four first current supply circuits (32) are provided in correspondence with the four radial magnetic bearing coils (154).

The second current supply circuits (33) use the energy stored in the second capacitor (25c) to supply a current to the thrust magnetic bearing coils (161a) so that the thrust magnetic bearing coils (161a) support the load of the drive shaft (131) in a non-contact manner. Each of the second current supply circuits (33) includes four switching elements (33a) constituting two switching legs and four freewheeling diodes (33b). Each switching leg includes two switching elements (33a) connected in series with each other and is connected in parallel with the second capacitor (25c). A midpoint between an upper-arm switching element (33a) and a lower-arm switching element (33a) of one of the switching legs is connected to one end of one of the thrust magnetic bearing coils (161a) of the thrust magnetic bearing (16), and a midpoint between an upper-arm switching element (33a) and a lower-arm switching element (33a) of the other switching leg is connected to the other end of the thrust magnetic bearing coil (161a). The two second current supply circuits (33) are provided in correspondence with the two thrust magnetic bearing coils (161a).

The third current supply circuit (34) uses the energy stored in the second capacitor (25c) to supply a current to the in-motor support coils (136a to 136c) so that the in-motor support coils (136a to 136c) support the load of the drive shaft (131) in a non-contact manner. The third current supply circuit (34) includes six switching elements (34a) constituting three switching legs and six freewheeling diodes (34b). The six switching elements (34a) are bridge-connected. Each switching leg includes two switching elements (34a) connected in series with each other and is connected in parallel with the second capacitor (25c).

A midpoint between an upper-arm switching element (34a) and a lower-arm switching element (34a) of each of the three switching legs is connected to a corresponding one of the in-motor support coils (136a to 136c) of the respective phases (the U-phase support coil, the V-phase support coil, and the W-phase support coil) of the motor (13). Each of the switching elements (34a) is connected antiparallel with a corresponding one of the freewheeling diodes (34b).

A control signal outputted from the control unit (40) is used to turn on or off the switching elements (32a) of the first current supply circuits (32), the switching elements (33a) of the second current supply circuits (33), and the switching elements (34a) of the third current supply circuit (34).

The control unit (40) generates and outputs a PWM control signal for PWM on/off control of the switching elements (22a) of the inverter circuit (22). The PWM control signal is generated based on the zero-crossing signal outputted from the zero-crossing detection circuit (27), the voltage at a connection point of the first and second voltage dividing resistors (26a, 26b), the voltage at a connection point of the third and fourth voltage dividing resistors (26c, 26d), the u-phase current detected by the u-phase current detector (28), and the w-phase current detected by the w-phase current detector (29).

The control unit (40) also generates and outputs a control signal for on/off control of the switching elements (32a) of the first current supply circuits (32), a control signal for on/off control of the switching elements (33a) of the second current supply circuits (33), and a control signal for on/off control of the switching elements (34a) of the third current supply circuit (34) so that the drive shaft (131) of the motor (13) is located at a desired position. The control signals are generated based on a value detected by a gap sensor (not shown) capable of detecting a gap between the stator (132) and the rotor (133) and a value detected by a gap sensor (not shown) capable of detecting a gap between the disc portion (131a) and the thrust magnetic bearing (16).

The power conversion device (20) is configured to allow the second capacitor (25c) to absorb greater electric energy from the drive coils (135a to 135c) due to a counter electromotive force generated in the drive coils (135a to 135c) than the first capacitor (24) when the inverter circuit (22) stops supplying the second alternating current to the drive coils (135a to 135c).

The turbo compressor (1) is configured to satisfy the following formulae (1) and (2), where C1 represents the capacity of the first capacitor (24), Vc11 represents the withstanding voltage of the first capacitor (24), Vc12 represents the peak voltage of the first capacitor (24) supplying the voltage to the drive coils (135a to 135c), C2 represents the capacity of the second capacitor (25c), Vc21 represents the withstanding voltage of the second capacitor (25c), Vc22 represents the peak voltage of the second capacitor (25c) supplying the voltage to the drive coils (135a to 135c), and E represents the maximum magnetic energy stored in the drive coils (135a to 135c).

$$C1(Vc11^2 - Vc12^2) < C2(Vc21^2 - Vc22^2) \quad \text{Formula (1)}$$

$$C1(Vc11^2 - Vc12^2)/2 < E \quad \text{Formula (2)}$$

When the voltage of the first capacitor (24) greatly varies with the inverter circuit (22), the first current supply circuits (32), the second current supply circuits (33), and the third current supply circuit (34) being driven by the power supplied from the three-phase AC power source (2), the regulator (25b) of the turbo compressor (1) configured as described above regulates the current flowing from the second capacitor (25c) to the first capacitor (24) so that the current flowing from the second capacitor (25c) to the first capacitor (24) when the second capacitor (25c) has a higher voltage than the first capacitor (24) by a predetermined voltage difference is smaller than a current flowing from the first capacitor (24) to the second capacitor (25c) when the first capacitor (24) has a higher voltage than the second capacitor (25c) by the predetermined voltage difference. Thus, the voltage variation of the first capacitor (24) has a reduced influence on the voltage variation of the second capacitor (25c).

Although the capacitance of the first capacitor (24) is reduced, the voltage of the second capacitor (25c), which is inputted to the first current supply circuits (32), the second current supply circuits (33), and third current supply circuit (34), varies less. This allows stable control for supporting the radial and thrust loads of the drive shaft (131) in a non-contact manner without providing a DC-DC converter for stabilizing the input voltage.

In the turbo compressor (1) configured as described above, if power failure occurs when the inverter circuit (22), the first current supply circuits (32), the second current supply circuits (33), and the third current supply circuit (34) are driven by the power supplied from the three-phase AC power source (2), the inverter circuit (22) stops the switching operation to stop the supply of the second alternating current to the drive coils (135a to 135c). Then, a counter electromotive force is generated in the drive coils (135a to 135c), and the current flows from the drive coils (135a to 135c) to the first and second capacitors (24, 25c). As a result, the magnetic energy (electric energy) stored in the drive coils (135a to 135c) is absorbed and stored as electrostatic energy by both of the first and second capacitors (24, 25c). Thus, even if the capacity of the first capacitor (24) is reduced, the first capacitor (24) is less likely to be damaged by the counter electromotive force of the drive coils (135a to 135c) as compared to when the second capacitor (25c) is not provided. At this time, the surge voltage reduction circuit (25) connected between the reactor (23) and the inverter circuit (22) allows the second capacitor (25c) to absorb the magnetic energy stored in the drive coils (135a to 135c) easily.

After the power failure occurs, the first current supply circuits (32), the second current supply circuits (33), and the third current supply circuit (34) use the energy stored in the second capacitor (25c) to supply the current to the radial magnetic bearing coils (154), the thrust magnetic bearing coils (161a), and the in-motor support coils (136a to 136c). This allows the radial magnetic bearing coils (154), the thrust magnetic bearing coils (161a), and the in-motor support coils (136a to 136c) to keep supporting the drive shaft (131) for a while. Although the electrostatic energy of the first capacitor (24) is consumed by some load, e.g., a control power source, a discharge resistor, or regenerative control of the inverter circuit (22), and the voltage of the first capacitor (24) drops, the regulative diode (25b) can keep the electrostatic energy from flowing from the second capacitor (25c) to the first capacitor (24), allowing almost all the energy stored in the second capacitor (25c) to be used for supporting the drive shaft (131).

Figure 7:
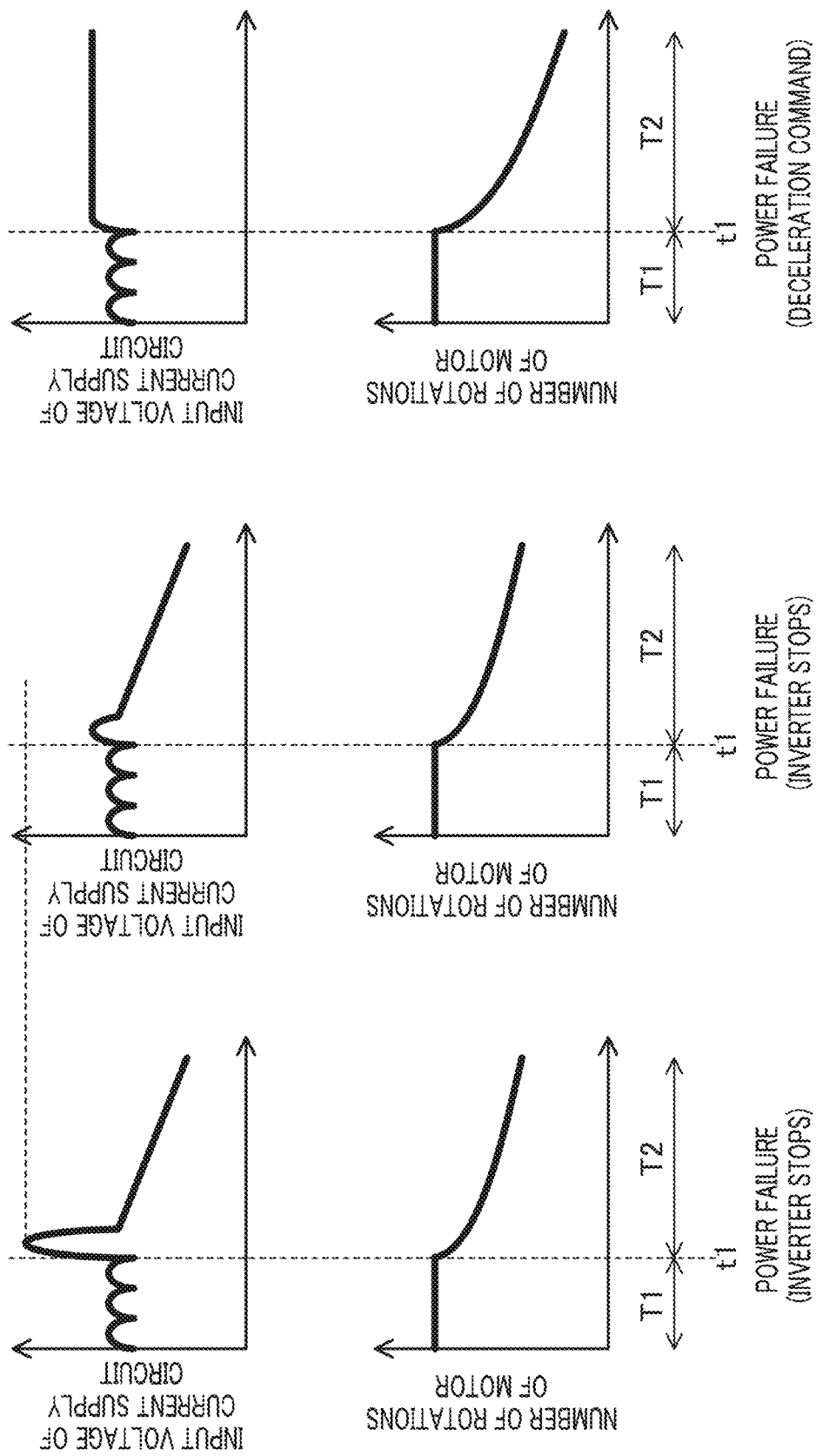
FIG. 7A is a graph illustrating an input voltage of a first current supply circuit, a second current supply circuit, and a third current supply circuit and a graph of the number of rotations of a motor when the power conversion device has no surge voltage reduction circuit.
FIG. 7B is a graph corresponding to FIG. 7A of the first embodiment.
FIG. 7C is a graph corresponding to FIG. 7A when the motor performs a regenerative operation.

The graphs in FIG. 7A show the input voltage of the first, second, and third current supply circuits (32), (33), and (34) and the number of rotations of the motor (13) when the power conversion device (20) has no surge voltage reduction circuit (25) and the voltage of the first capacitor (24) is inputted to the first, second, and third current supply circuits (32), (33), and (34).

The graphs of FIG. 7B show the input voltage of the first, second, and third current supply circuits (32), (33), and (34) and the number of rotations of the motor (13) of the first embodiment.

In the graphs of FIG. 7A and FIG. 7B, the inverter circuit (22) stops supplying the second alternating current to the drive coils (135a to 135c) at time t1 due to the power failure. In a period T1, the power supplied from the three-phase AC power source (2) drives the inverter circuit (22), the first current supply circuits (32), the second current supply circuits (33), and the third current supply circuit (34). In a period T2, the inverter circuit (22) stops the switching operation.

In the graphs of FIG. 7B, the current flows from the drive coils (135a to 135c) to both of the first and second capacitors (25c) due to the counter electromotive force at time t1. Thus, compared with FIG. 7A, a peak value of the surge voltage temporarily applied to the inputs of the first, second, and third current supply circuits (32), (33), and (34) is lowered immediately after the power failure. This allows stable current supply to the radial magnetic bearing coils (154), the thrust magnetic bearing coils (161a), and the in-motor support coils (136a to 136c) without providing a DC-DC converter for stabilizing the voltage inputted to the first, second, and third current supply circuits (32), (33), and (34) or without performing regenerative control as described in Patent Document 1. Further, the regulative diode (25b) can keep the electrostatic energy from flowing from the second capacitor (25c) to the first capacitor (24). This can allocate almost all the energy stored in the second capacitor (25c) to the support of the drive shaft (131) and can keep the drive shaft (131) supported for a while although the voltage of the first capacitor (24) drops due to consumption of the electrostatic energy of the first capacitor (24) by some load.

In the first embodiment, the first, second, and third current supply circuits (32), (33), and (34) use, not the energy stored in the first capacitor (24), but the energy stored in the second capacitor (25c), to supply the current to the radial magnetic bearing coils (154), the thrust magnetic bearing coils (161a), and the in-motor support coils (136a to 136c). Thus, variation of the voltage of the first capacitor (24), i.e., the voltage between the first and second DC nodes (22c, 22d) of the inverter circuit (22), has a reduced influence on the current supplied to the coils (154, 161a, 136a to 136c). This allows stable current supply to the coils (154, 161a, 136a to 136c) without providing a DC-DC converter for stabilizing the voltage inputted to the first, second, and third current supply circuits (32), (33), and (34) or without performing regenerative control as described in Patent Document 1.

The first capacitor (24) allows the pulsation of the output voltage of the converter circuit (21), making the capacity of the first capacitor (24) smaller than when the pulsation can be absorbed. This can reduce the size of the first capacitor (24).

The formula (1) is satisfied, allowing the second capacitor (25c) to absorb greater electric energy of the drive coils (135a to 135c) than the first capacitor (24) when the inverter circuit (22) stops supplying the second alternating current to the drive coils (135a to 135c).

Further, when the formula (2) is satisfied, it is unnecessary to increase the capacitance or withstanding voltage of the first capacitor (24) to such an extent that the first capacitor (24) can absorb the maximum magnetic energy stored in the drive coils (135a to 135c), reducing the size of the first capacitor (24).

The second capacitor (25c) has a greater capacitance than the first capacitor (24), and thus the voltage of the second capacitor (25c) is easily stabilized. This allows stable current supply to the radial magnetic bearing coils (154), the thrust magnetic bearing coils (161a), and the in-motor support coils (136a to 136c).

The resistor (25a) is connected in series with the second capacitor (25c), reducing an inrush current flowing to the second capacitor (25c) at the start of the power supply from the three-phase AC power source (2). This requires no additional circuit for reducing the inrush current, reducing the cost of components. The resistor (25a) may be omitted when the surge voltage reduction circuit (25) does not require the function of reducing the inrush current, for example, when a circuit for reducing the inrush current is provided for another component except the surge voltage reduction circuit (25).

The bearingless motor including the in-motor support coils (136a to 136c) is used as the motor (13), and thus the size of the turbo compressor (1) can be reduced.

The surge voltage reduction circuit (25) has no voltage changer such as a DC-DC converter that includes an inductance element and a switch and is able to actively raise or lower the voltage of the second capacitor (25c), making the configuration of the power conversion device (20) simple.

No voltage changer such as a DC-DC converter that is able to actively raise or lower the input voltage of the first current supply circuits (32), the second current supply circuits (33), and the third current supply circuit (34) is provided between the second capacitor (25c) and the first, second, and third current supply circuits (32), (33), and (34), making the configuration of the power conversion device (20) simple.

Further, no voltage changer that is able to actively raise or lower the voltage of the second capacitor (25c) is provided between the surge voltage reduction circuit (25) and the pair of wires (L1, L2), making the configuration of the power conversion device (20) simple.

Second Embodiment

Figure 8:
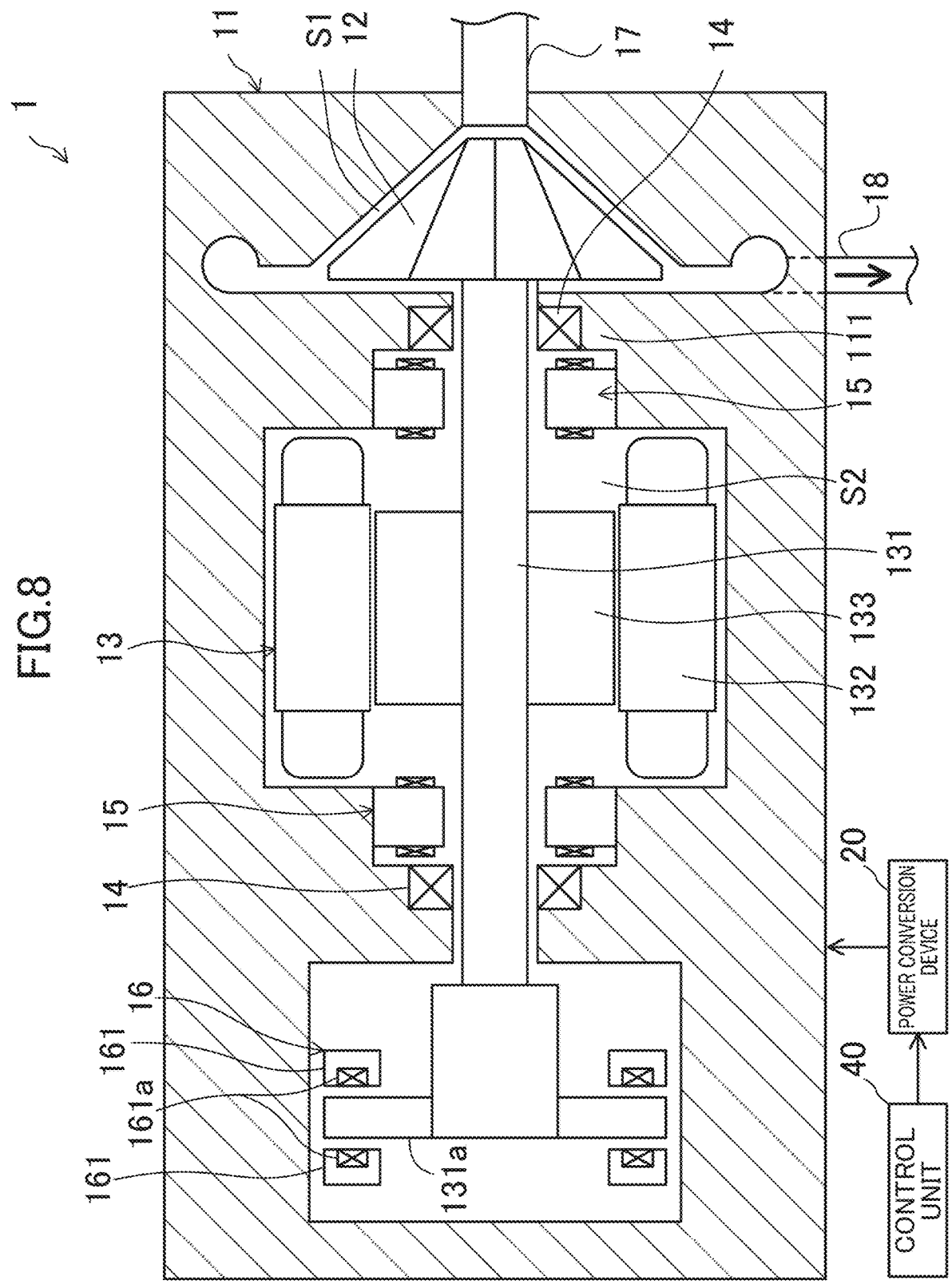
FIG. 8 is a view corresponding to FIG. 1, illustrating a second embodiment.

FIG. 8 shows a turbo compressor (1) of a second embodiment. In the second embodiment, the motor (13) is not a bearingless motor but a permanent magnet synchronous motor or any other motor having no in-motor support coils (136a to 136c).

Two radial magnetic bearings (15) are provided and arranged on the axial sides of the stator (132) and rotor (133) of the motor (13).

Figure 9:
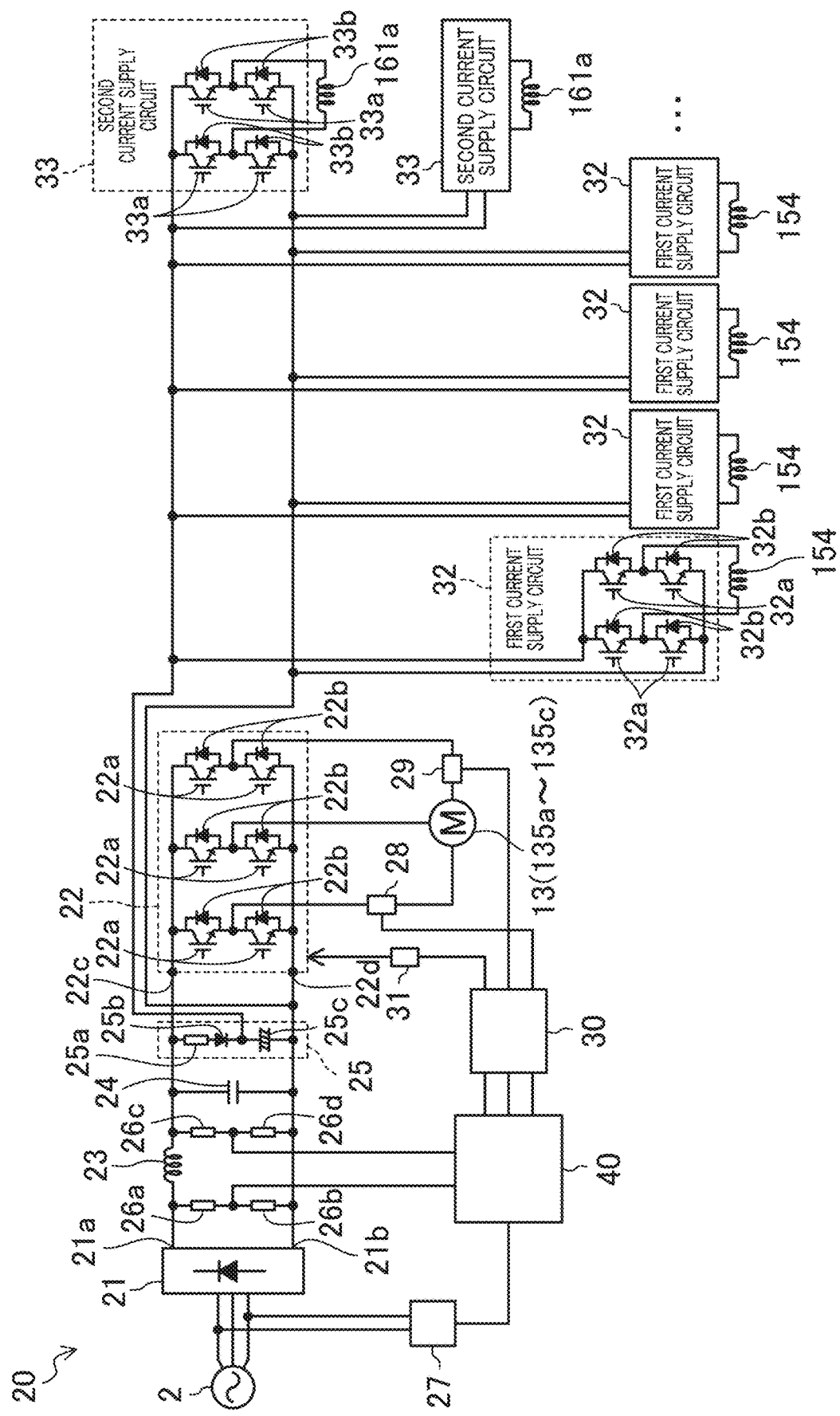
FIG. 9 is a view corresponding to FIG. 6, illustrating the second embodiment.

Thus, as illustrated in FIG. 9, the power conversion device (20) includes eight first current supply circuits (32) corresponding to the eight radial magnetic bearing coils (154). The power conversion device (20) has no third current supply circuit (34).

The second embodiment is the same as, or similar to the first embodiment apart from the difference mentioned above. Thus, the like reference characters are used to indicate the like components, and their detailed description will not be repeated.

Third Embodiment

Figure 10:
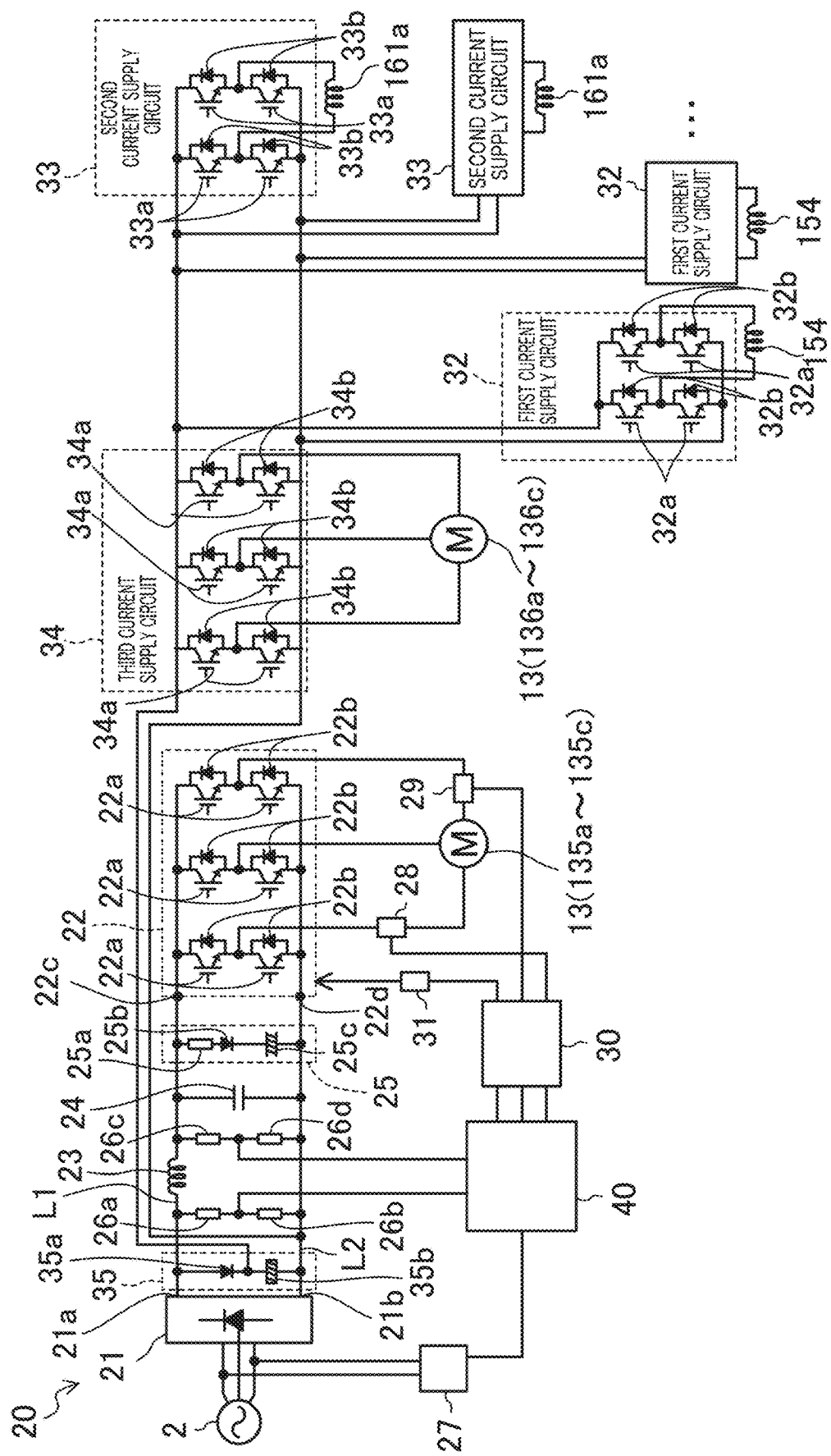
FIG. 10 is a view corresponding to FIG. 6, illustrating a third embodiment.

FIG. 10 is a view corresponding to FIG. 6, illustrating a third embodiment. In the third embodiment, a buffer circuit (35) is provided between the pair of wires (L1, L2) in addition to the surge voltage reduction circuit (25) to be located closer to the converter circuit (21) than the reactor (23). The buffer circuit (35) includes a buffer circuit diode (35a) as the regulator and a buffer circuit capacitor (35b) as the second capacitor. The buffer circuit diode (35a) and the buffer circuit capacitor (35b) are connected in series in order from the first output node (21a), i.e., from the first wire (L1). The first current supply circuits (32), the second current supply circuits (33), and the third current supply circuit (34) use the energy stored in the buffer circuit capacitor (35b) instead of the energy stored in the second capacitor (25c).

The third embodiment is the same as, or similar to the first embodiment apart from the difference mentioned above. Thus, the like reference characters are used to indicate the like components, and their detailed description will not be repeated.

Fourth Embodiment

Figure 11:
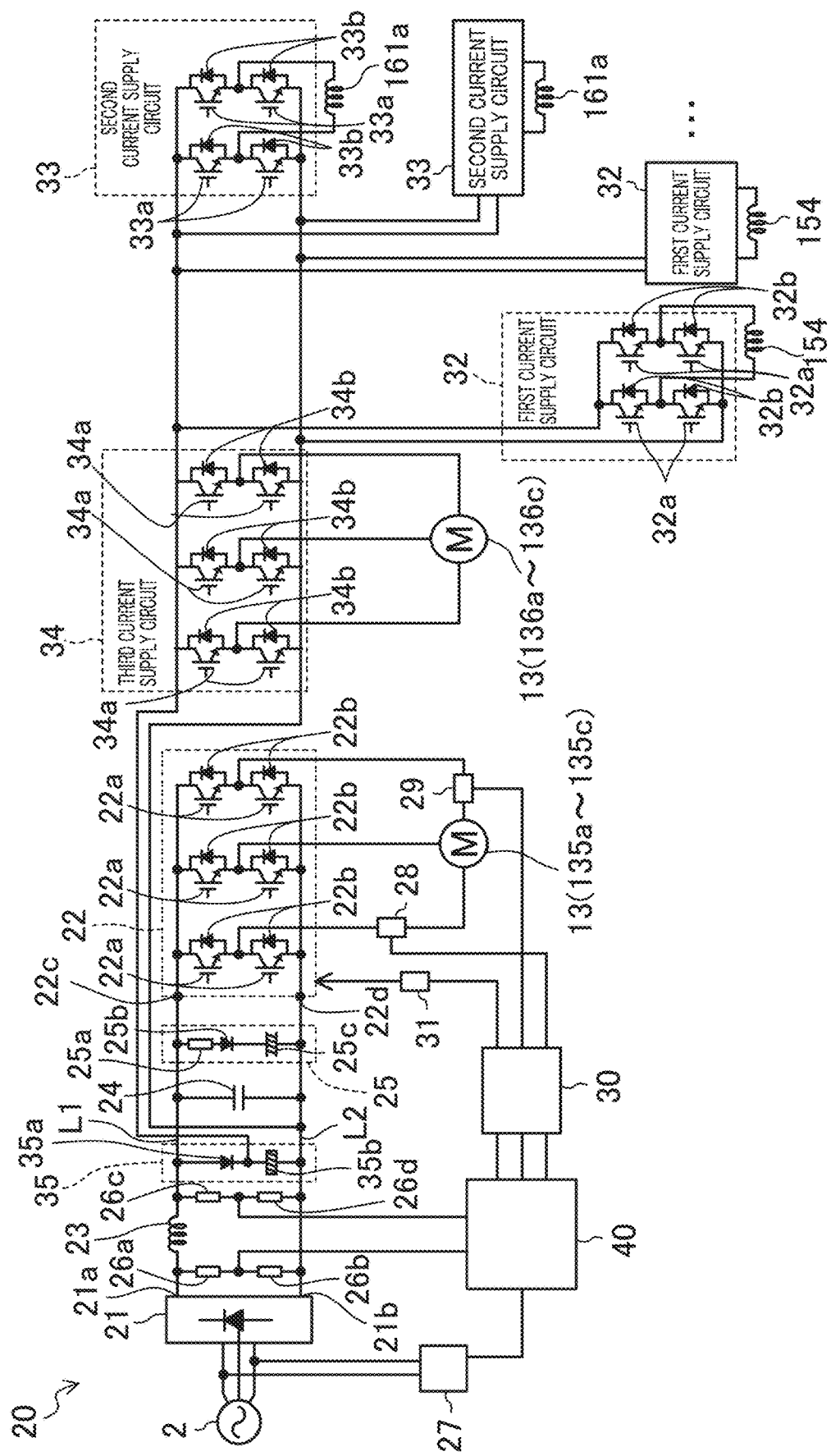
FIG. 11 is a view corresponding to FIG. 10, illustrating a fourth embodiment.

FIG. 11 is a view corresponding to FIG. 10, illustrating a fourth embodiment. In the fourth embodiment, a buffer circuit (35) is provided between the reactor (23) and the first capacitor (24) and between the pair of wires (L1, L2).

The fourth embodiment is the same as, or similar to the third embodiment apart from the difference mentioned above. Thus, the like reference characters are used to indicate the like components, and their detailed description will not be repeated.

Other Variations

It has been described in the first and second embodiments that the inverter circuit (22) stops the switching operation at the time of power failure. However, the control unit (40) may perform control so that the inverter circuit (22) continues the switching operation. For example, immediately after the power failure, the inverter circuit (22) may cause the motor (13) to perform the regenerative operation of converting the kinetic energy of the drive shaft (131) into electric energy so that the motor (13) is further decelerated than in the normal operation and that the voltage of the first capacitor (24) is higher than in the normal operation. The graphs of FIG. 7C show the input voltage of the first, second, and third current supply circuits (32), (33), and (34) and the number of rotations of the motor (13) in this case.

Also, in the example of FIG. 7C, the regulative diode (25b) keeps the electrostatic energy from flowing from the second capacitor (25c) to the first capacitor (24) even if the electrostatic energy of the first capacitor (24) is consumed by the regenerative control and the voltage of the first capacitor (24) drops after the inverter circuit (22) stops supplying the second alternating current to the drive coils (135a to 135c) at time t1 due to the power failure. This can allocate almost all the energy stored in the second capacitor (25c) to the support of the drive shaft (131) and can keep the drive shaft (131) supported for a while.

It has been described in the first to fourth embodiments that the resistor (25a) of the surge voltage reduction circuit (25) is connected to the first DC node (22c) of the regulative diode (25b). However, the resistor (25a) may be connected to the second DC node (22d), i.e., to the second capacitor (25c). Specifically, the anode of the regulative diode (25b) may be connected to the first DC node (22c), and the cathode of the regulative diode (25b) may be connected to the resistor (25a).

The surge voltage reduction circuit (25) may further include a resistor having a high resistance value and connected in parallel with the regulative diode (25b), and the regulative diode (25b) and the resistor may constitute the regulator.

Alternatively, the regulative diode (25b) may be replaced with a bi-directional switch, and the bi-directional switch may be controlled so that the current flowing from the second capacitor (25c) to the first capacitor (24) when the second capacitor (25c) has a higher voltage than the first capacitor (24) by a predetermined voltage difference is smaller than a current flowing from the first capacitor (24) to the second capacitor (25c) when the first capacitor (24) has a higher voltage than the second capacitor (25c) by the predetermined voltage difference. The regulative diode (25b) may be replaced with a unidirectional switch such as an insulated gate bipolar transistor (IGBT) that allows the current to flow only in a direction from the first capacitor (24) to the second capacitor (25c), and the current may be controlled by switching control of the unidirectional switch.

The buffer circuit diode (35a) of the third and fourth embodiments may be replaced with a metal-oxide-semiconductor field-effect transistor (MOSFET), and a body diode of the MOSFET may regulate the current flowing from the buffer circuit capacitor (35b) to the first capacitor (24) so that the current flowing from the buffer circuit capacitor (35b) to the first capacitor (24) when the buffer circuit capacitor (35b) has a higher voltage than the first capacitor (24) by a predetermined voltage difference is smaller than the current flowing from the first capacitor (24) to the buffer circuit capacitor (35b) when the first capacitor (24) has a higher voltage than the buffer circuit capacitor (35b) by the voltage difference. Specifically, the body diode of the MOSFET may serve as the regulator.

As can be seen in the foregoing, the present disclosure is useful for a power conversion device that rotationally drives a drive shaft of a motor and supplies power to support coils that support the drive shaft in a non-contact manner by an electromagnetic force.

The invention claimed is:

1. A power conversion device configured to rotationally drive a drive shaft of a motor and supply power to support coils that support the drive shaft in a non contact manner by an electromagnetic force, the power conversion device comprising:
a converter circuit configured to
convert a first alternating current from an AC power source into a direct current and
output the direct current to a pair of wires;
an inverter circuit including a switching element, the inverter being configured to
convert the direct current outputted from the converter circuit to the pair of wires into a second alternating current by a switching operation of the switching element and
supply the second alternating current to drive coils of the motor so that the drive shaft is rotationally driven;
a first capacitor connected between the pair of wires;
a buffer circuit including a second capacitor and a regulator connected in series with the second capacitor, the buffer circuit being connected between the pair of wires; and
a current supply circuit configured to supply a current to the support coils using energy stored in the second capacitor so that a load of the drive shaft is supported in a non contact manner,
the first capacitor being configured to
allow pulsation of a voltage outputted from the converter circuit and
absorb voltage variation between the pair of wires caused by the switching operation, and
the regulator being configured to regulate a current flowing from the second capacitor to the first capacitor so that
the current flowing from the second capacitor to the first capacitor when the second capacitor has a higher voltage than the first capacitor by a predetermined voltage difference is smaller than
a current flowing from the first capacitor to the second capacitor when the first capacitor has a higher voltage than the second capacitor by the predetermined voltage difference.

2. The power conversion device of claim 1, wherein the second capacitor is able to absorb greater electric energy from the drive coils due to a counter electromotive force generated in the drive coils than the first capacitor when the inverter circuit stops supplying the second alternating current to the drive coils.

3. The power conversion device of claim 2, further comprising:
a reactor provided on at least one of the pair of wires between the converter circuit and the first capacitor, the buffer circuit being connected between the reactor and the inverter circuit.

4. The power conversion device of claim 2, wherein no voltage changer that is able to actively raise or lower a voltage inputted to the current supply circuit is provided between the second capacitor and the current supply circuit.

5. The power conversion device of claim 2, wherein no voltage changer that is able to actively raise or lower the voltage of the second capacitor is provided between the buffer circuit and the pair of wires.

6. The power conversion device of claim 2, wherein $C1(Vc11^2 - Vc12^2) < C2(Vc21^2 - Vc22^2)$, where C1 represents a capacity of the first capacitor,
Vc11 represents a withstanding voltage of the first capacitor,
Vc12 represents a peak voltage of the first capacitor during supplying of the second alternating current to the drive coils,
C2 represents a capacity of the second capacitor,
Vc21 represents a withstanding voltage of the second capacitor, and
Vc22 represents a peak voltage of the second capacitor during supplying of the second alternating current to the drive coils.

7. The power conversion device of claim 1, further comprising:
a reactor provided on at least one of the pair of wires between the converter circuit and the first capacitor, the buffer circuit being connected between the reactor and the inverter circuit.

8. The power conversion device of claim 2, wherein the buffer circuit
has no voltage changer that includes an inductance element and a switch and
is able to actively raise or lower the voltage of the second capacitor.

9. The power conversion device of claim 7, wherein the buffer circuit
has no voltage changer that includes an inductance element and a switch and
is able to actively raise or lower the voltage of the second capacitor.

10. The power conversion device of claim 7, wherein no voltage changer that is able to actively raise or lower a voltage inputted to the current supply circuit is provided between the second capacitor and the current supply circuit.

11. The power conversion device of claim 7, wherein no voltage changer that is able to actively raise or lower the voltage of the second capacitor is provided between the buffer circuit and the pair of wires.

12. The power conversion device of claim 7, wherein $C1(Vc11^2 - Vc12^2) < C2(Vc21^2 - Vc22^2)$, where C1 represents a capacity of the first capacitor,
Vc11 represents a withstanding voltage of the first capacitor,
Vc12 represents a peak voltage of the first capacitor during supplying of the second alternating current to the drive coils,
C2 represents a capacity of the second capacitor,
Vc21 represents a withstanding voltage of the second capacitor, and
Vc22 represents a peak voltage of the second capacitor during supplying of the second alternating current to the drive coils.

13. The power conversion device of claim 1, wherein the buffer circuit
has no voltage changer that includes an inductance element and a switch and
is able to actively raise or lower the voltage of the second capacitor.

14. The power conversion device of claim 1, wherein no voltage changer that is able to actively raise or lower a voltage inputted to the current supply circuit is provided between the second capacitor and the current supply circuit.

15. The power conversion device of claim 1, wherein no voltage changer that is able to actively raise or lower the voltage of the second capacitor is provided between the buffer circuit and the pair of wires.

16. The power conversion device of claim 1, wherein $C1(Vc11^2 - Vc12^2) < C2(Vc21^2 - Vc22^2)$, where C1 represents a capacity of the first capacitor, Vc11 represents a withstanding voltage of the first capacitor, Vc12 represents a peak voltage of the first capacitor during supplying of the second alternating current to the drive coils, C2 represents a capacity of the second capacitor, Vc21 represents a withstanding voltage of the second capacitor, and Vc22 represents a peak voltage of the second capacitor during supplying of the second alternating current to the drive coils.

17. The power conversion device of claim 1, wherein $C1(Vc11^2 - Vc12^2)/2 < E$, where C1 represents a capacity of the first capacitor, Vc11 represents a withstanding voltage of the first capacitor, Vc12 represents a peak voltage of the first capacitor during supplying of the second alternating current to the drive coils, and E represents the maximum magnetic energy stored in the drive coils.

18. The power conversion device of claim 1, wherein the second capacitor has a greater capacitance than the first capacitor.

19. The power conversion device of claim 1, wherein the buffer circuit further includes a resistor connected in series with the second capacitor.

20. The power conversion device of claim 1, wherein the support coils that receive the current from the current supply circuit are provided in the motor and support a radial load of the drive shaft in a non contact manner.

* * * * *